(12) United States Patent
Davies

(10) Patent No.: US 6,494,033 B1
(45) Date of Patent: Dec. 17, 2002

(54) SEQUENTIALLY OPERATED ACTUATOR WITH BRAKE ARRANGEMENT

(75) Inventor: Stephen H Davies, Telford (GB)

(73) Assignee: Lucas Industries Limited (DE)

( * ) Notice: Subject to any disclaimer, the term of this patent is extended or adjusted under 35 U.S.C. 154(b) by 0 days.

(21) Appl. No.: 09/569,420

(22) Filed: May 12, 2000

(30) Foreign Application Priority Data

May 14, 1999 (GB) .............................................. 9911148

(51) Int. Cl.[7] .............................................. F16H 25/22
(52) U.S. Cl. .................... 60/226.2; 74/89.35; 74/424.8; 188/162
(58) Field of Search ....................... 188/162, 83, 82.74; 60/226.2; 74/89.35, 89.25, 424.2

(56) References Cited

U.S. PATENT DOCUMENTS

| | | | |
|---|---|---|---|
| 3,203,269 A | | 8/1965 | Perrine |
| 3,404,581 A | * | 10/1968 | Kraus ........................ 60/226.2 |
| 3,421,383 A | * | 1/1969 | Smith et al. ................ 60/226.2 |
| 3,422,696 A | | 1/1969 | Valenti |
| 3,630,328 A | * | 12/1971 | Nelson ....................... 74/424.8 |
| 4,589,531 A | * | 5/1986 | Washbourn ................. 188/72.2 |
| 4,590,816 A | * | 5/1986 | Weyer ........................ 74/424.8 |
| RE32,610 E | * | 2/1988 | Washbourne et al. ........ 188/162 |
| 4,742,896 A | | 5/1988 | Granbom |
| 4,747,320 A | | 5/1988 | Nilsson |
| 5,070,985 A | * | 12/1991 | Davies et al. ................ 192/141 |
| 5,097,933 A | * | 3/1992 | Davies ........................ 192/141 |
| 5,259,515 A | * | 11/1993 | Hitomi ......................... 188/83 |
| 5,359,848 A | * | 11/1994 | Davies ....................... 60/226.2 |
| 5,848,554 A | | 12/1998 | Kober et al. |
| 6,167,694 B1 | * | 1/2001 | Davies ....................... 60/226.2 |

* cited by examiner

Primary Examiner—Matthew C. Graham
(74) Attorney, Agent, or Firm—Andrus, Sceales, Starke & Sawall

(57) ABSTRACT

An actuator comprising, a first, rotatable member arranged to be driven by a motor, a sleeve, said first member cooperating with said sleeve such that rotation of the first member at a given speed relative to said sleeve causes the sleeve to be translated axially at a first speed through a predetermined distance, stop means limiting axial translation of the sleeve reative to the first member whereafter during continued rotation of the first member the sleeve rotates with the first member, a second, non-rotatable, member, said sleeve cooperating with said second member whereby rotation of the sleeve at said given speed causes axial translation of the second member relative to said sleeve at a second speed and, a brake arrangement applying a braking force to the sleeve, the braking force resisting rotation of the sleeve but not significantly affecting translation of the sleeve.

9 Claims, 2 Drawing Sheets

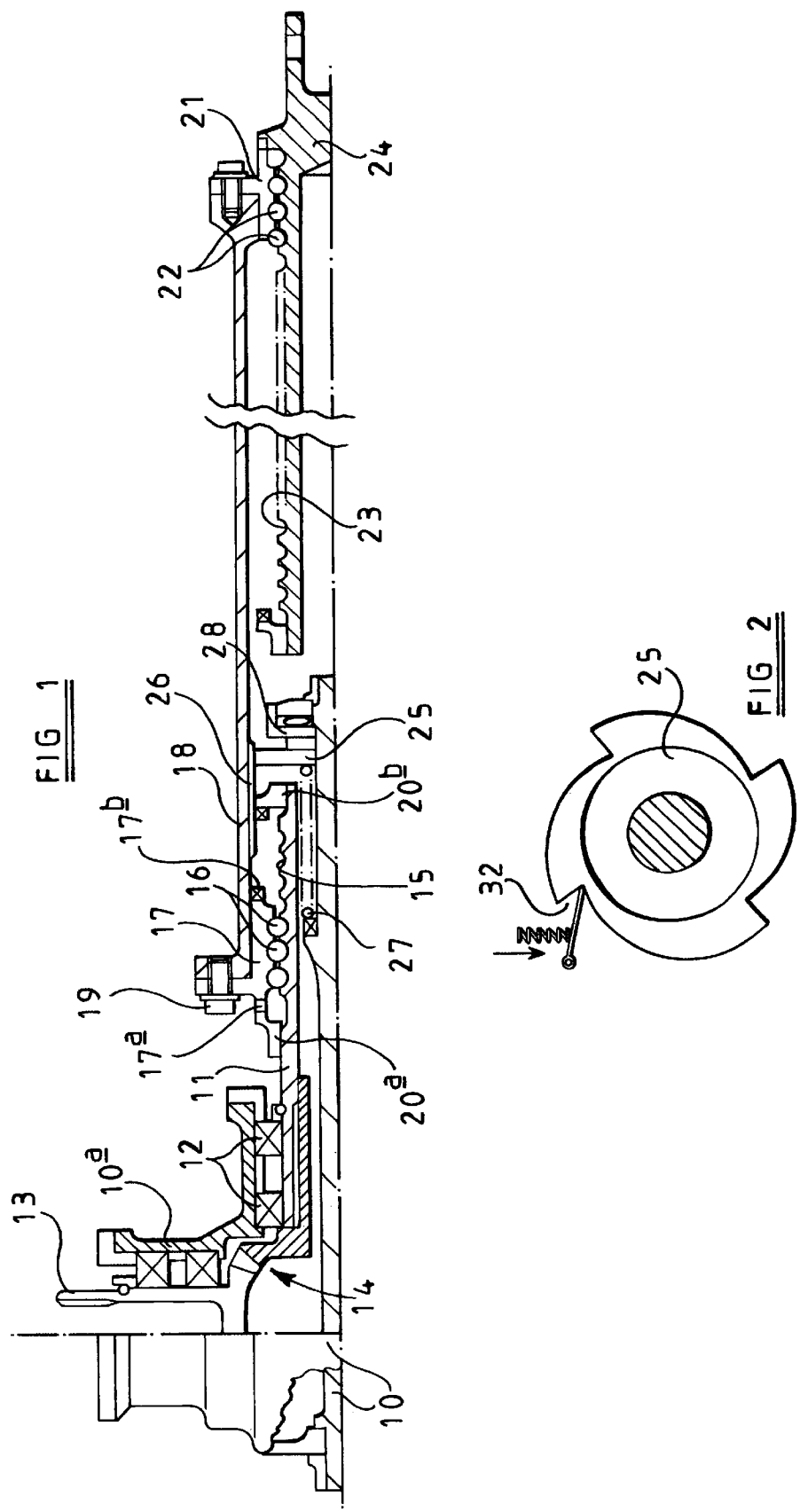

SEQUENTIALLY OPERATED ACTUATOR WITH BRAKE ARRANGEMENT

This invention relates to an actuator. The invention is particularly suitable for use in an electrically-operated thrust reverser system, but it will be appreciated that the invention may also be used in other applications.

One type of actuator suitable for use in deploying a thrust reverser cowl utilizes a ball screw mechanism comprising a first element which is rotatable by a motor, the first element cooperating with a second, non-rotatable element such that rotation of the first element causes translation of the second element. The second element is secured in use to the cowl to be moved.

When using low friction screw arrangements of this type to generate axial translation there is a risk that axial loads imposed on the second element may tend to generate rotation of the first element and it is an object of the invention to minimise the risk. Thus according to the present invention there is provided an actuator comprising a first rotatable, element arranged to be driven by a motor in use, a second, axially translatable, element coacting with said first element by way of a low friction screw arrangement whereby rotation of said first element relative to said second element results in axial translation of said second element relative to said first element, and, a brake arrangement applying a braking force to said first element to resist rotation thereof relative to said second element.

It has been found in certain applications that in order to deploy the thrust reverser cowl, the initial force necessary to move the second member must be high, but that movement of the member beyond a predetermined position is possible by applying a lower magnitude force. An actuator has been proposed which is capable of providing an initial, high deploying force phase followed by a phase in which the deploying force applied by the actuator is of reduced magnitude. The actuator comprises a first, rotatable member arranged to be driven by a motor, the first member cooperating with a sleeve such that rotation of the first member causes the sleeve to translate at a low speed through a predetermined distance. Once such translation has been completed, the sleeve rotates with the first member. The sleeve cooperates with a second, non-rotatable member, and rotation of the sleeve causes translation of the second member. The cooperation between the sleeve and the first and second members is such that, for a given speed of rotation of the first member, the sleeve, and hence the second member, initially translates at a low speed, the second member translating at an increased speed when rotation of the sleeve commences.

In use, it is found that once the initial high resistance of deploying movement of the thrust reverser cowl caused by the air flow over the cowl, has been overcome, the air flow tends to assist movement of the cowl. It is desirable to ensure that such assisting or aiding loads or forces are not transmitted back through the actuator as rotational movement, to the motor used to drive the actuator. It is an object of the invention to provide an actuator in which such assisting or aiding loads or forces are not applied to the motor.

According to a second aspect of the present invention there is provided an actuator of the type described hereinbefore, characterised by a brake arrangement applying a braking force to the sleeve, the braking force resisting rotation of the sleeve but not significantly affecting translation of the sleeve.

In such an arrangement, the actuator drive motor does not need to overcome the resistance imposed by the brake arrangement during the initial operating phase in which the actuator extends at a low rate applying a large magnitude force to, for example, a cowl associated with the actuator as the sleeve does not rotate during this phase. However the brake arrangement acts to apply a braking force resisting rotation of the sleeve during the subsequent phase, thereby avoiding or restricting the transmission of any aiding or assisting loads or forces to the motor used to drive the actuator.

The brake arrangement conveniently comprises a brake element rotatable with the sleeve, but slidable longitudinally relative thereto, said element being biased into engagement with a fixed brake surface. It will be appreciated, however, that other brake arrangements are possible. For example, the brake element could be slidably, non-rotatably mounted upon a fixed member and biased into engagement with a surface associated with the sleeve.

Preferably, the cooperation between the sleeve and the first member is achieved using a fine or low pitch ball screw. The cooperation between the sleeve and the second member may be achieved by means of a coarse or higher pitch ball screw. In some circumstances, it is desirable for the actuator to be capable of being reversed by the application of axial load thereto so that rather than simply applying a braking force reducing the speed of rotation of the sleeve, the sleeve is incapable of being rotated by the application of axial loading. Such a result may be achieved by arranging for the cooperation between the sleeve and the second member to take the form of an acme screw thread coupling. In such an arrangement, the brake element may be omitted, the screw threaded cooperation between the sleeve and the second member defining the brake arrangement.

The invention will further be described, by way of example, with reference to the accompanying drawings, in which:

FIG. 1 is a sectional view of part of an actuator in accordance with an embodiment of the invention;

FIG. 2 is a diagrammatic representation of a modification of the brake of FIG. 1; and, FIG. 3 is a view similar to FIG. 1 of a modification.

Figure 3:
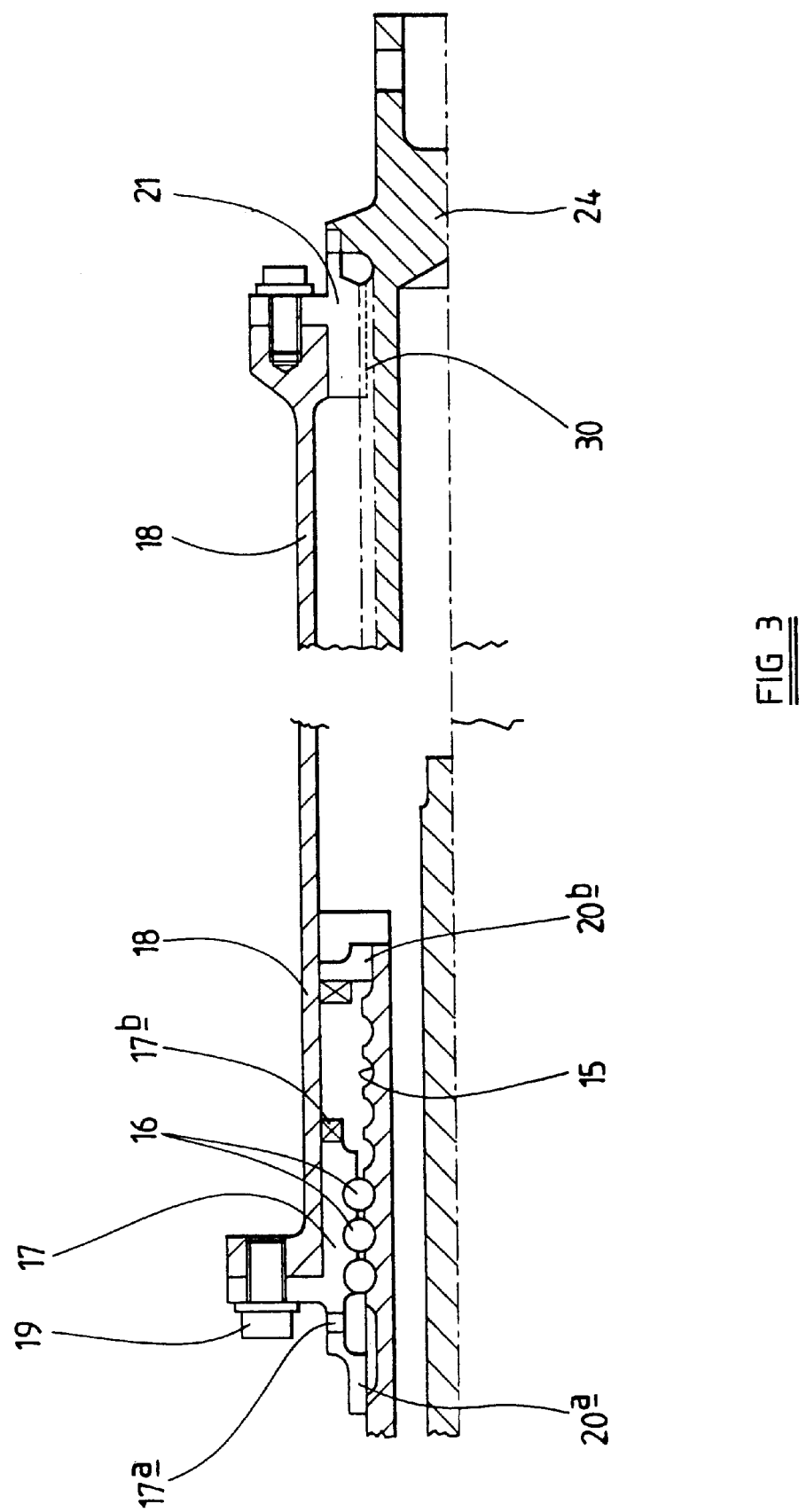

The accompanying drawing illustrates an actuator arrangement suitable for use in moving a cowl of a thrust reverser for an aircraft. The actuator comprises a housing arrangement 10 which is arranged to be secured, in use, to an aircraft frame. The housing 10 includes a part 10a which supports a first member 11 for rotation relative to the housing 10. Appropriate bearings 12 are provided between the first member 11 and the housing part 10a. The first member 11 is arranged to be driven by a motor through an input shaft 13 and a crown gear arrangement 14.

The first member 11 is provided with a helical groove defining a relatively fine pitch screw thread formation 15, spherical elements 16 being arranged to ride within the groove of the thread formation 15. The spherical elements 16 are carried by a carriage 17 secured to a tubular sleeve 18 so as to define a ball-screw arrangement. As illustrated, the carriage 17 is secured to the sleeve 18 by a plurality of bolts 19. It will be appreciated, however, that the carriage 17 may be secured to the sleeve 18 using any suitable technique, and that, if desired, the carriage 17 could be omitted the spherical elements 16 being carried directly by the sleeve 18. The carriage 17 is shaped to define abutments 17a, 17b which are engageable with stop members 20a, 20b carried by the first member 11 to limit the distance along the first member 11 through which the carriage 17 can move.

The end of the sleeve 18 remote from the end which carries the carriage 17 is provided with a second carriage 21 carrying spherical elements 22 which are arranged to ride within a relatively coarse pitch screw thread formation 23 provided on a second member 24. The second member 24 is arranged to be secured to the cowl to be moved, the second member 24 being non-rotatable but being translatable to move the cowl between a stowed position and a deployed position. As with the carriage 17, the carriage 21 is shaped to define abutments which are engageable with stops mounted upon or forming part of the second member 24 to limit the axial stroke of the coarse pitch ball-screw arrangement 21, 22, 23, 24.

A brake arrangement is provided to resist rotation of the sleeve 18, the brake arrangement comprising an annular brake element 25 which is secured to the sleeve 18 by means of a spline arrangement 26 such that the brake element 25 is rotatable with the sleeve 18 but is free to move axially or longitudinally relative to the sleeve 18. The brake element 25 is biased by means of a spring 27 which abuts part of the housing 10 into engagement with a brake surface provided on an element 28 non-rotatably mounted to the housing 10. The engagement between the brake element 25 and the brake surface of the element 28 is such that rotation of the sleeve 18 relative to the housing 10 is resisted by a constant friction braking force.

In use, starting with the actuator in its retracted configuration as illustrated in FIG. 1, rotation of the input shaft 13 causes rotation of the first member 11.

As the thread formation 23 is of coarser pitch than the thread formation 15, the frictional forces between the spherical elements 22 and the second member 24 and the carriage 21 will be sufficient to ensure that the member 11 rotates in the sleeve 18 rather than the sleeve 18 rotating with the member 11. Thus rotation of the first member 11 causes the sleeve 18 and the second member 24 to translate relative to the first member 11, such a translation continuing until the abutment 17b of the carriage 17 moves into engagement with the stop member 20b secured to the first member 11 whereupon further rotation of the member 11 relative to the sleeve 18 is impossible. As the screw formation 15 is of relatively fine pitch, for a given speed of rotation of the first member 11, the sleeve 18 and the second member 24 translate at a relatively low speed. During this stage of the operation of the actuator, as the sleeve 18 is not rotating no braking force needs to be overcome by the motor. However any tendency for the sleeve 18 to rotate initially with the member 11 will be resisted by the brake arrangement so that the sleeve 18 will not rotate until the carriage 17 has completed its movement relative to the first member 11.

During the translational movement of the sleeve 18, the brake element 25 which is secured to the sleeve 18 through the spline arrangement 26 will remain in contact with the brake surface of the element 28, and will not impede translational movement of the sleeve 18, such a translation being permitted by the spline arrangement 26.

Once the carriage 17 has completed movement relative to the first member 11 and further axial movement of the sleeve 18 on the member 11 is prevented, continued rotational movement of the first member 11 will be transmitted through the sleeve 18 (which now rotates with the member 11) to the carriage 21 and spherical elements 22. As the second member 24 is held against rotation by the cowl, rotational movement of the sleeve 18 relative to the second member 24 will cause the second member 24 to translate. The translation of the second member 24 occurs at an increased rate for a given motor speed during this part of the operation of the actuator as the thread formation 23 is of coarser pitch than the thread formation 15. The rotation of the sleeve 18 during this part of the operation of the actuator is resisted, in part, by the application of a braking force to the sleeve 18 by the brake arrangement, the braking force resulting from the engagement between the brake element 25 and the brake surface of the element 28, the brake element 25 rotating with the sleeve 18 during this phase of the operation of the actuator.

It will be appreciated that during the second phase of the operation of the actuator in which the rotational movement of the sleeve 18 is resisted by the brake arrangement, movement of the first member 11 by the motor is against an increased load. However, during this phase of the operation of the actuator, it is likely that the thrust reverser cowl will have moved to a position in which the air flow over the cowl assists deployment of the cowl and so applies an aiding or assisting axial load to the actuator tending to extend the actuator. The operation of the brake arrangement imposes a resistance to rotation of the sleeve which thus resists the tendency of the sleeve to be rotated by the application of axial load to the actuator. Thus the brake resists movement of the cowl by the assisting or aiding load, and avoids the transmission of the assisting or aiding load, in the form of rotation of the sleeve 18 and member 11, to the motor which is used to drive the actuator.

After deployment of the thrust reverser, if the cowl is to be returned to its stowed position, the motor is driven in its reverse direction. Such operation causes the carriage 17 and spherical elements 16 to ride along the thread formation of the first member 11 until the carriage 17 reaches the position illustrated in the accompanying drawing whereupon the abutments prevent further axial movement of the sleeve 18 on the member 11. Once this position is reached, the sleeve 18 will commence rotation relative to the second member 24 causing the carriage 21 and spherical elements 22 to ride along the thread formation 23 to the position illustrated. As, during a normal stowing operation, the air flow over the thrust reverser will be relatively low, the movement of the cowl is not assisted by an aiding or assisting load. In order to minimise the load which must be applied by the motor to move the cowl from its deployed position to its stowed position, a ratchet arrangement 32 (FIG. 2) is conveniently provided, the ratchet arrangement disengaging the brake arrangement from the sleeve 18 or member 10 during this operation so that the motor need not act against the braking force which is applied by the brake arrangement during rotation of the sleeve 18 in the opposite rotational direction during deployment of the thrust reverser.

Although in the description hereinbefore, the cooperation between the sleeve 18 and the first and second members 11, 24 is achieved by means of a ball screw arrangement, it will be appreciated that, if desired, an acme screw coupling may be used instead of the ball screw. It will be understood that a "conventional" screw thread such as an acme thread has an inherent friction and therefore resistance to rotation much in excess of that of a ball screw, to the extent that where a ball screw may rotate when subject to an axial load, this cannot normally happen with a conventional or acme thread. Thus as shown in FIG. 3 where for example an acme threaded coupling 30 is used in place of the ball screw it will result in the actuator being incapable of transmitting axial loads back to the motor in the form of rotation. As a result, in the event of the application of a high magnitude assisting or aiding load, movement of the cowl from its deployed position to its stowed position will not occur as the application of a load to the second member 24 will not result in rotational movement of the sleeve 18. It will be appreciated that, in such an arrangement, the brake element 25 and brake surface associated with the element 28 may be omitted as the rotational movement of the sleeve 18 is prevented or restricted by the cooperation between the sleeve 18 and the non-rotatable second member 24 thus there is no necessity to hold the sleeve 18 against rotational movement relative to the housing 10.

It is thought that, in use, two actuators of the type illustrated would be used with a thrust reverser cowl, a third actuator of the type including an acme screw thread also being provided, the third actuator being located between the two actuators of the type illustrated. In normal use, the braking force achieved by the engagement between the brake element 25 and the brake surface associated with the element 28 is sufficient to avoid overload of the motors. However, where the aircraft is under a rejected take-off condition, the magnitude of the assisting load imposed on the cowl and actuators is far in excess of that experienced under normal use, and in such circumstances, the acme screw thread cooperation between the sleeve 18 and the second member 24 of the third actuator will be sufficient to withstand the assisting load applied by the cowl. The additional actuator is located between the actuators of the type illustrated as, in such a position, the magnitude of the aiding load applied to the actuator including the acme screw thread only become significant under rejected take-off conditions.

Moreover as described above the brake could be equipped with a ratchet 32 as described with reference to FIG. 2, so that the brake is effective to resist rotation of the rotatable element in one direction only.

What I claim is:

1. An actuator comprising, a first, rotatable member arranged to be driven by a motor, a sleeve, the first member cooperating with the sleeve such that rotation of the first member at a given speed relative to the sleeve causes the sleeve to be translated axially at a first speed through a predetermined distance, stop means limiting axial translation of the sleeve relative to the first member so that after complete axial translation of the sleeve during continued rotation of the first member the sleeve rotates with the first member, the sleeve rotates with the first member, a second, non-rotatable, member, the sleeve cooperating with the second member whereby rotation of the sleeve at the given speed causes axial translation of the second member relative to the sleeve at a second speed and, a brake arrangement applying a braking force to the sleeve, the braking force resisting rotation of the sleeve but not significantly affecting translation of the sleeve.

2. An actuator as claimed in claim 1 wherein the brake arrangement comprises a brake element rotatable with the sleeve but slidable axially relative thereto, said element being biased into engagement with a fixed brake surface.

3. An actuator as claimed in claim 1 wherein the brake arrangement comprises a brake element non-rotatably mounted upon a fixed member so as to be axially slidable relative thereto and biased into engagement with a surface associated with said sleeve.

4. An actuator as claimed in claim 1 wherein the cooperation between the sleeve and the first member is achieved using a fine or low pitch ball screw.

5. An actuator as as claimed in claim 4 wherein the cooperation between the sleeve and the second member is achieved using a coarse or higher pitch ball screw.

6. An actuator as as claimed in claim 4 wherein the cooperation between the sleeve and the second member is in the form of an acme screw thread coupling.

7. An actuator as claimed in claim 1 wherein the cooperation between the sleeve and the second member is in the form of an acme screw thread coupling, the cooperation between the sleeve and the second member defining the brake arrangement.

8. An actuator as claimed in claim 1 including a ratchet mechanism associated with the brake arrangement whereby the brake arrangement is operative in relation to rotation in one direction only.

9. An actuator as claimed in claim 1 including a ratchet mechanism associated with the brake arrangement whereby the brake arrangement is operative in relation to rotation in one direction only.

* * * * *